United States Patent
Mahalank et al.

(10) Patent No.: US 11,812,271 B2
(45) Date of Patent: Nov. 7, 2023

(54) METHODS, SYSTEMS, AND COMPUTER READABLE MEDIA FOR MITIGATING 5G ROAMING ATTACKS FOR INTERNET OF THINGS (IOT) DEVICES BASED ON EXPECTED USER EQUIPMENT (UE) BEHAVIOR PATTERNS

(71) Applicant: Oracle International Corporation, Redwood Shores, CA (US)

(72) Inventors: Shashikiran Bhalachandra Mahalank, Bangalore (IN); Jay Rajput, Bangalore (IN); Iyappan Chellasamy, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 215 days.

(21) Appl. No.: 17/125,943

(22) Filed: Dec. 17, 2020

(65) Prior Publication Data

US 2022/0201489 A1    Jun. 23, 2022

(51) Int. Cl.
*H04W 12/122* (2021.01)
*H04W 12/68* (2021.01)
(Continued)

(52) U.S. Cl.
CPC ........... *H04W 12/122* (2021.01); *H04W 8/04* (2013.01); *H04W 12/68* (2021.01); *H04W 84/042* (2013.01)

(58) Field of Classification Search
CPC ..... H04W 12/122; H04W 12/68; H04W 8/04; H04W 84/042
See application file for complete search history.

(56) References Cited

U.S. PATENT DOCUMENTS 6,091,958 A    7/2000   Bergkvist et al.
6,151,503 A    11/2000  Chavez
(Continued)

FOREIGN PATENT DOCUMENTS

CN    101277541 A   10/2008
CN    10135561 A    1/2009
(Continued)

OTHER PUBLICATIONS

Supplemental Notice of Allowability for U.S. Appl. No. 17/076,482 (dated Jan. 19, 2023).
(Continued)

*Primary Examiner* — Brian F Shaw
(74) *Attorney, Agent, or Firm* — Jenkins, Taylor & Hunt P.A.

(57) ABSTRACT

A method for mitigating a 5G roaming attack for an Internet of things (IoT) device based on expected user equipment (UE) behavior patterns includes receiving, at a network function (NF) including at least one processor, a service request message requesting a service from a home public land mobile network (PLMN) of a UE identified in the service request message, wherein the UE comprises an IoT device and obtaining, for the UE identified in service request message, at least one parameter provisioned in the home PLMN to indicate an expected UE behavior pattern. The method further includes comparing the at least one parameter provisioned in the home PLMN to indicate the expected UE behavior pattern to at least one parameter from the service request message and that the at least one parameter from the service request message is not indicative of the expected UE behavior pattern of the UE. The method further includes dropping or rejecting the service request message.

12 Claims, 5 Drawing Sheets

(51) Int. Cl.
*H04W 8/04* (2009.01)
*H04W 84/04* (2009.01)

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,681,360 B1 | 6/2017 | Salyers et al. |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,045,326 B2 | 8/2018 | Blanchard et al. |
| 10,168,413 B2 | 1/2019 | Annamalai et al. |
| 10,212,538 B2 | 2/2019 | Russell |
| 10,230,726 B2 | 3/2019 | Barkan |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,637,838 B1 | 4/2020 | Larios et al. |
| 10,652,850 B2 | 5/2020 | Landais et al. |
| 10,776,791 B2 | 9/2020 | Ferguson et al. |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 | 3/2021 | Mehta |
| 10,984,128 B1 | 4/2021 | Hoffer |
| 11,050,788 B2 | 6/2021 | Livanos |
| 11,068,534 B1 | 7/2021 | Svendsen |
| 11,140,555 B2 | 10/2021 | Thai et al. |
| 11,265,695 B2 | 3/2022 | Shah et al. |
| 11,272,560 B1 | 3/2022 | Vivanco et al. |
| 11,368,839 B2 | 6/2022 | Targali |
| 11,411,925 B2 | 8/2022 | Kumar et al. |
| 11,516,671 B2 | 11/2022 | Rajput et al. |
| 11,528,251 B2 | 12/2022 | Rajput et al. |
| 11,553,342 B2 | 1/2023 | Mahalank et al. |
| 11,622,255 B2 | 4/2023 | Iddya et al. |
| 11,689,912 B2 | 6/2023 | Nair et al. |
| 11,700,510 B2 | 7/2023 | Chaurasia et al. |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0076430 A1 | 3/2008 | Olson |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0246178 A1 | 10/2011 | Arzelier |
| 2011/0307381 A1 | 12/2011 | Kim et al. |
| 2012/0099715 A1 | 4/2012 | Ravishankar et al. |
| 2012/0110637 A1 | 5/2012 | Holtmanns et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0276035 A1 | 10/2013 | Walker et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0370922 A1 | 12/2014 | Richards |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0081579 A1 | 3/2015 | Brown et al. |
| 2015/0094060 A1 | 4/2015 | Kouridakis et al. |
| 2015/0119092 A1 | 4/2015 | Yi et al. |
| 2015/0121078 A1 | 4/2015 | Fu et al. |
| 2015/0188979 A1 | 7/2015 | Almeras et al. |
| 2015/0244486 A1 | 8/2015 | Liang et al. |
| 2015/0304220 A1 | 10/2015 | Miyao |
| 2015/0304803 A1 | 10/2015 | Chen et al. |
| 2015/0341341 A1 | 11/2015 | Messerges |
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |
| 2016/0183117 A1 | 6/2016 | Hsu et al. |

(56) References Cited

U.S. PATENT DOCUMENTS

| | | |
|---|---|---|
| 2016/0183178 A1 | 6/2016 | Marimuthu |
| 2016/0219043 A1 | 7/2016 | Blanke |
| 2016/0234119 A1* | 8/2016 | Zaidi ................ H04L 47/2433 |
| 2016/0269566 A1 | 9/2016 | Gundamaraju et al. |
| 2016/0292687 A1 | 10/2016 | Kruglick |
| 2016/0337976 A1 | 11/2016 | Wang et al. |
| 2016/0365983 A1 | 12/2016 | Shahabuddin et al. |
| 2016/0381699 A1 | 12/2016 | Rubin et al. |
| 2017/0006431 A1 | 1/2017 | Donovan et al. |
| 2017/0142547 A1 | 5/2017 | Hou et al. |
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0245280 A1 | 8/2017 | Yi et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1 | 10/2017 | Peylo et al. |
| 2017/0345006 A1 | 11/2017 | Kohli |
| 2017/0366499 A1 | 12/2017 | De Boer et al. |
| 2018/0020324 A1 | 1/2018 | Beauford |
| 2018/0109632 A1 | 4/2018 | Stammers et al. |
| 2018/0109953 A1 | 4/2018 | He |
| 2018/0115970 A1 | 4/2018 | Chae et al. |
| 2018/0167906 A1 | 6/2018 | Chellamani et al. |
| 2018/0205698 A1 | 7/2018 | Gupta et al. |
| 2018/0220301 A1 | 8/2018 | Gallagher et al. |
| 2018/0270765 A1 | 9/2018 | Wang |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1 | 1/2019 | Russell |
| 2019/0037484 A1 | 1/2019 | Davies et al. |
| 2019/0044932 A1 | 2/2019 | Kumar et al. |
| 2019/0074982 A1 | 3/2019 | Hughes |
| 2019/0090086 A1 | 3/2019 | Graham et al. |
| 2019/0116624 A1 | 4/2019 | Tandon et al. |
| 2019/0182875 A1 | 6/2019 | Talebi Fard et al. |
| 2019/0253885 A1 | 8/2019 | Bykampadi et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2019/0364460 A1 | 11/2019 | Bogineni et al. |
| 2020/0007538 A1 | 1/2020 | Mehta |
| 2020/0036754 A1 | 1/2020 | Livanos |
| 2020/0042799 A1 | 2/2020 | Huang et al. |
| 2020/0053044 A1 | 2/2020 | Mahalank et al. |
| 2020/0077260 A1 | 3/2020 | Hancock et al. |
| 2020/0107291 A1 | 4/2020 | Nayak et al. |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344604 A1* | 10/2020 | He ..................... H04W 12/088 |
| 2020/0359218 A1 | 11/2020 | Lee et al. |
| 2020/0404490 A1 | 12/2020 | Thai et al. |
| 2021/0022070 A1 | 1/2021 | Letor et al. |
| 2021/0111985 A1 | 4/2021 | Mahalank et al. |
| 2021/0112012 A1 | 4/2021 | Krishnan et al. |
| 2021/0142143 A1 | 5/2021 | Howard |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1 | 7/2021 | Jost et al. |
| 2021/0211946 A1 | 7/2021 | Li |
| 2021/0234706 A1 | 7/2021 | Nair et al. |
| 2021/0243165 A1 | 8/2021 | Bykampadi et al. |
| 2021/0250186 A1 | 8/2021 | Bykampadi et al. |
| 2021/0258824 A1 | 8/2021 | John et al. |
| 2021/0274436 A1 | 9/2021 | Sun et al. |
| 2021/0297942 A1 | 9/2021 | Bykampadi et al. |
| 2021/0321303 A1 | 10/2021 | Nair et al. |
| 2021/0377138 A1 | 12/2021 | Sun et al. |
| 2021/0377212 A1 | 12/2021 | Holtmanns et al. |
| 2021/0399988 A1 | 12/2021 | Labonte |
| 2021/0400538 A1 | 12/2021 | Ke |
| 2021/0406038 A1 | 12/2021 | Fetzer et al. |
| 2022/0021586 A1 | 1/2022 | Kazmierski |
| 2022/0022027 A1 | 1/2022 | Xin et al. |
| 2022/0022040 A1 | 1/2022 | Mahalank et al. |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104020 A1 | 3/2022 | Rajput et al. |
| 2022/0104112 A1 | 3/2022 | Rajput et al. |
| 2022/0124079 A1 | 4/2022 | Patil et al. |
| 2022/0124479 A1 | 4/2022 | Iddya |
| 2022/0124501 A1 | 4/2022 | Bykampadi et al. |
| 2022/0150212 A1 | 5/2022 | Rajput |
| 2022/0158847 A1 | 5/2022 | Aggarwal et al. |
| 2022/0159445 A1 | 5/2022 | Rajavelu |
| 2022/0174544 A1 | 6/2022 | Taft et al. |
| 2022/0182923 A1 | 6/2022 | Yao et al. |
| 2022/0191694 A1 | 6/2022 | Rajput |
| 2022/0191763 A1 | 6/2022 | Roeland et al. |
| 2022/0200951 A1 | 6/2022 | Goel |
| 2022/0200966 A1 | 6/2022 | De-Gregorio-Rodriguez et al. |
| 2022/0240084 A1 | 7/2022 | Speidel et al. |
| 2022/0256312 A1 | 8/2022 | Kim et al. |
| 2022/0264260 A1 | 8/2022 | Chaurasia et al. |
| 2022/0272069 A1 | 8/2022 | Verma et al. |
| 2022/0272541 A1 | 8/2022 | Rajput et al. |
| 2022/0369091 A1 | 11/2022 | Nair |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 103179504 A | 6/2013 |
| CN | 103444212 A | 12/2013 |
| CN | 107800664 A | 3/2018 |
| CN | 108307385 A | 7/2018 |
| CN | 110035433 A | 7/2019 |
| CN | 110800322 B | 5/2021 |
| CN | Z L201880040478.3 | 4/2022 |
| CN | ZL 202080007649.X | 9/2022 |
| EP | 1 067 492 A2 | 1/2001 |
| EP | 1 906 682 A1 | 4/2008 |
| EP | 2 204 955 A1 | 7/2010 |
| EP | 2 785 125 B1 | 8/2018 |
| EP | 3 493 569 A1 | 6/2019 |
| EP | 3 646 630 B1 | 8/2021 |
| EP | 3 662 630 | 8/2021 |
| EP | 3954146 A1 | 2/2022 |
| EP | 3 821 630 B1 | 7/2022 |
| EP | 4183154 A1 | 5/2023 |
| EP | 3954146 B1 | 6/2023 |
| ES | 2 548 005 T3 | 10/2015 |
| GB | 2503973 A | 1/2014 |
| IN | 401247 | 7/2022 |
| JP | 2008-053808 A | 3/2008 |
| JP | 7038148 B2 | 3/2022 |
| JP | 7113147 B | 8/2022 |
| JP | 7133010 | 8/2022 |
| JP | 7133010 B2 | 9/2022 |
| JP | 7198339 B | 12/2022 |
| JP | 7234342 B2 | 3/2023 |
| JP | 7246418 B2 | 3/2023 |
| KR | 20180069737 A | 6/2018 |
| WO | WO 01/88790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |
| WO | WO 2010/021886 A1 | 2/2010 |
| WO | WO 2010/045646 A2 | 4/2010 |
| WO | WO 2010/105099 A2 | 9/2010 |
| WO | WO 2011/010640 A1 | 1/2011 |

(56) References Cited

FOREIGN PATENT DOCUMENTS

| | | |
|---|---|---|
| WO | WO 2011/047382 A2 | 4/2011 |
| WO | WO 2016/201990 A1 | 12/2016 |
| WO | WO 2017/082532 A1 | 5/2017 |
| WO | WO 2018/202284 A1 | 11/2018 |
| WO | WO 2019/005287 A1 | 1/2019 |
| WO | WO 2019/027813 A1 | 2/2019 |
| WO | WO 2019/158028 A | 8/2019 |
| WO | WO 2019/224157 A1 | 11/2019 |
| WO | WO 2020/013889 A1 | 1/2020 |
| WO | WO 2020/033113 A1 | 2/2020 |
| WO | WO 2020/036883 A1 | 2/2020 |
| WO | WO 2020/164763 A1 | 8/2020 |
| WO | WO 2020/174121 A1 | 9/2020 |
| WO | WO 2020/179665 A1 | 9/2020 |
| WO | WO 2020/210015 A1 | 10/2020 |
| WO | WO 2020/257018 A1 | 12/2020 |
| WO | WO 2021/13 8072 A1 | 7/2021 |
| WO | WO 2022/015378 A1 | 1/2022 |
| WO | WO 2022/046176 A1 | 3/2022 |
| WO | WO 2022/066227 | 3/2022 |
| WO | WO 2022/066228 A1 | 3/2022 |
| WO | WO 2022/086596 A1 | 4/2022 |
| WO | WO 2022/098404 A1 | 5/2022 |
| WO | WO 2022/103454 A1 | 5/2022 |
| WO | WO 2022/132315 A1 | 6/2022 |
| WO | WO 2022/132316 A1 | 6/2022 |
| WO | WO 2022/182448 A1 | 9/2022 |
| WO | WO 2022/240582 A1 | 11/2022 |

OTHER PUBLICATIONS

Non-Final Office Action for U.S. Appl. No. 17/129,441 (dated Jan. 19, 2023).
Intent to Grant for European Patent Application No. 18705270.9 (dated Dec. 8, 2022).
Applicant Initiated Interview Summary for U.S. Appl. No. 17/319,023 (dated Jan. 10, 2023).
Non-Final Office Action for U.S. Appl. No. 17/099,683 (dated Jan. 4, 2023).
Telekom, "N32 Message Anti-Spoofing within the SEPP", 3GPP TSG SA WG3 (Security) Meeting #91, S3-181480, pp. 1-2 (Apr. 2018).
Huawei, "New Annex for the SEPP in TR 33.926", 3GPP TSG-SA WG3 Meeting #95-BIS, S3-192180, pp. 1-5 (Jun. 2019).
"5G; 5G System; Public Land Mobile Network (PLMN) Interconnection; Stage 3 (3GPP TS 29.573 Version 16.3.0 Release 16)," ETSI TS 129 573, V16.3.0, pp. 1-93 (Jul. 2020).
Communication under Rule 71(3) EPC Intention to Grant for European Patent Application Serial No. 20 720 580.8 (dated Dec. 23, 2022).
Non-Final Office Action for U.S. Appl. No. 17/095,420 (dated Jan. 3, 2023).
Applicant-Initiated Interview Summary for U.S. Appl. No. 17/099,683 (dated Dec. 12, 2022).
Notice of Allowance and Fee(s) Due for U.S. Appl. No. 17/076,482 (dated Dec. 1, 2022).
Notice to Grant for Japanese Patent Application Serial No. 2021-500828 (dated Nov. 25, 2022).
Examination Report for Indian Application Serial No. 202247032585 (dated Nov. 15, 2022).
Non-Final Office Action for Chinese Patent Application Serial No. 202080091056.6 (dated Oct. 27, 2022).
Non-Final Office Action for U.S. Appl. No. 17/008,528 (dated Nov. 10, 2022).
Notification of reasons for refusal for Japanese Patent Application No. 2020-572898 (dated Oct. 25, 2022).
Advisory Action for U.S. Appl. No. 17/076,482 (dated Oct. 25, 2022).
Final Office Action and Applicant-Initiated Interview Summary for U.S. Appl. No. 17/099,683 (dated Oct. 24, 2022).

Communication of European publication number and information on the application of Article 67(3) EPC for European Patent Application No. 20842462.2 (dated Oct. 12, 2022).
Decision to grant a European patent pursuant to Article 97(1) EPC for European Patent Application Serial No. 19749059.2 (dated Sep. 29, 2022).
Decision to Grant for Japanese Patent Application Serial. No. 2020-505462 (dated Aug. 2, 2022).
Non-Final Office Action for U.S. Appl. No. 17/319,023 (dated Sep. 28, 2022).
Non-Final Office Action for U.S. Appl. No. 17/123,038 (dated Sep. 30, 2022).
Communication of European publication number and information on the application of Article 67(3) EPC for European Patent Application Serial No. 20720580.8 (dated Jan. 19, 2022).
Non-Final Office Action for U.S. Appl. No. 17/175,260 (dated Aug. 29, 2022).
Notice of Allowance and Fee(s) Due and Examiner-Initiated Interview Summary for U.S. Appl. No. 16/929,048 (dated Aug. 24, 2022).
Notification of Transmittal of the International Search Report and the Written Opinion of the International Searching Authority or the Declaration for International Application No. PCT/US2022/026415 (dated Aug. 12, 2022).
Notice to Grant for Japanese Patent Application Serial No. 2021-545918 (dated Jun. 28, 2022).
"5G; Policy and Charging Control signaling flows and parameter mapping (3GPP TS 29.513 version 15.6.0 Release 15)," ETSI TS 129 513, V15.6.0, pp. 1-92 (Jan. 2020).
Final Office Action for U.S. Appl. No. 17/076,482 (dated Aug. 5, 2022).
Notice of Allowance and Fee(s) Due and Examiner-Initiated Interview Summary for U.S. Appl. No. 17/129,487 (dated Jul. 25, 2022).
Notice of Allowance and Fee(s) Due and Examiner-Initiated Interview Summary for U.S. Appl. No. 17/185,934 (dated Jul. 21, 2022).
"5G; Architecture enhancements for 5G System (5GS) to support network data analytics services (3GPP TS 23.288 version 16.4.0 Release 16)," ETSI TS 123 288, V16.4.0, pp. 1-68 (Jul. 2020).
Communication of European publication number and information on the application of Article 67(3) EPC for European Patent Application Serial No. 19730571.7 (dated Apr. 8, 2021).
International Search Report for International Patent Application Serial No. PCT/US2020/065763 (dated Apr. 6, 2021).
First Examination Report for Indian Patent Application Serial No. 201947047367 (dated Mar. 31, 2021).
Notice of Allowance for Chinese Patent Application Serial No. 201880040477.9 (dated Mar. 29, 2021).
Communication under Rule 71 (3) EPC Intention to Grant for European Patent Application Serial No. 18 731 923.1 (dated Mar. 22, 2021).
First Examination Report for Indian Patent Application Serial No. 201947047012 (dated Mar. 18, 2021).
Commonly-assigned, co-pending U.S. Appl. No. 17/185,934 for "Methods, Systems, and Computer Readable Media for Mitigating Location Tracking and Denial of Service (DoS) Attacks that Utilize Access And Mobility Management Function (AMF) Location Service," (Unpublished, filed Feb. 25, 2021).
Communication under Rule 71(3) EPC Intention to grant for European Application Serial No. 18 756 018.0 (dated Feb. 24, 2021).
Commonly-assigned, co-pending U.S. Appl. No. 17/175,260 for "Methods, Systems, and Computer Readable Media for Short Message Delivery Status Report Validation," (Unpublished, filed Feb. 12, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).

(56) References Cited

OTHER PUBLICATIONS

"3rd Generation Partnership Project; Technical Specification Group Core Network and Terminals; Numbering, addressing and identification; (Release 17)," 3GPP TS 23.003, V17.0.0, pp. 1-142 (Dec. 2020).

"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).

"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).

"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

Commonly-assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (Inter-PLMN) Forwarding Interface," (Unpublished, filed Dec. 21, 2020).

Commonly-assigned, co-pending U.S. Appl. No. 17/129,487 for "Methods, Systems, and Computer Readable Media for Ingress Message Rate Limiting," (Unpublished, filed Dec. 21, 2020).

Commonly-assigned, co-pending U.S. Appl. No. 17/123,038 for "Methods, Systems, and Computer Readable Media for Message Validation in Fifth Generation (5G) Communications Networks," (Unpublished, filed Dec. 15, 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

Commonly-assigned, co-pending U.S. Appl. No. 17/099,683 for "Methods, Systems, and Computer Readable Media for Validating Location Update Messages," (Unpublished, filed Nov. 16, 2020).

Commonly-assigned, co-pending U.S. Appl. No. 17/095,420 for "Methods, Systems, and Computer Readable Media for Mitigating 5G Roaming Spoofing Attacks," (Unpublished, filed Nov. 11, 2020).

SMS Test Numbers: SMS Fake Delivery Receipts, Fake DLR—Tel!—SMS Test Platform and SMS services, Nov. 6, 2020, pp. 1-6, https://telqtele.com/sms-fake-delivery-receipts-fake-dlr/.

Notice of Allowance and Fee(s) Due and Examiner-Initiated Interview Summary for U.S. Appl. No. 16/379,488 (dated Oct. 23, 2020).

Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).

Notice of Allowance and Fee(s) Due and Examiner-Initiated Interview Summary for U.S. Appl. No. 16/024,422 (dated Oct. 21, 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).

"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).

"3rd Generation Partnership Project; Technical Specification Group Core Network and Terminals; Numbering, addressing and identification; (Release 16)," 3GPP TS 23.003, V16.4.0, pp. 1-141 (Sep. 2020).

"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).

"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).

Notice of Allowance and Fee(s) Due and Examiner-Initiated Interview Summary for U.S. Appl. No. 16/100,172 (dated Sep. 14, 2020).

Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).

First Office Action for Chinese Application Serial No. 201880040477.9 (dated Aug. 5, 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).

Notification of Transmittal of the International Search Report and the Written Opinion of the International Searching Authority, or the Declaration for International Application No. PCT/US2020/024234 (dated Jul. 16, 2020).

Non-Final Office Action for U.S. Appl. No. 16/379,488 (dated Jul. 15, 2020).

Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).

"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).

"3rd Generation Partnership Project; Technical Specification Group Services and System Aspects; Security architecture and procedures for 5G system (Release 16)," 3GPP TS 33.501, V16.3.0, pp. 1-248 (Jul. 2020).

Non-Final Office Action for U.S. Appl. No. 16/024,422 (dated Jul. 8, 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).

Applicant-Initiated Interview Summary for U.S. Appl. No. 16/100,172 (dated Jun. 9, 2020).

(56) References Cited

OTHER PUBLICATIONS

"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).

"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

Communication of European publication number and information on the application of Article 67(3) EPC for European Application Serial No. 18756018.0 (dated May 13, 2020).

Communication of European publication number and information on the application of Article 67(3) EPC for European Application Serial No. 18731923.1 (Apr. 8, 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).

Non-Final Office Action for U.S. Appl. No. 16/100,172 (dated Mar. 6, 2020).

Notice of Allowance and Fee(s) Due and Examiner-Initiated Interview Summary for U.S. Appl. No. 15/666,300 (dated Feb. 13, 2020).

Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).

Advisory Action and Applicant-Initiated Interview Summary for U.S. Appl. No. 16/100,172 (dated Dec. 20, 2019).

"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).

"FS.19 Diameter Interconnect Security," GSMA, pp. 1-3 (Dec. 20, 2019).

Notification of Transmittal of the International Search Report and the Written Opinion of the International Searching Authority, or the Declaration for International Application Serial No. PCT/US2019/042203 (dated Nov. 11, 2019).

Applicant-Initiated Interview Summary for U.S. Appl. No. 15/666,300 (Oct. 29, 2019).

Final Office Action for U.S. Appl. No. 16/100,172 (dated Oct. 3, 2019).

"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0 pp. 1-180 (Sep. 2019).

"Technical Specification Group Core Network and Terminals; Policy and Charging Control (PCC); Reference points (Release 16)," 3GPP TS 29.212, V16.1.0, pp. 1-285 (Sep. 2019).

Notification of Transmittal of the International Search Report and the Written Opinion of the International Searching Authority, or the Declaration for International Application Serial No. PCT/US2019/028814 (dated Aug. 20, 2019).

Applicant-Initiated Interview Summary for U.S. Appl. No. 16/100,172 (dated Jul. 18, 2019).

Notice of Allowance and Fee(s) Due and Examiner-Initiated Interview Summary for U.S. Appl. No. 15/376,631 (dated Jul. 2, 2019).

"Technical Specification Group Core Network and Terminals; Mobile Application Part (MAP) specification (Release 15)," 3GPP TS 29.002, V15.5.0, pp. 1-1024 (Jun. 2019).

Non-Final Office Action for U.S. Appl. No. 15/666,300 (dated Jun. 27, 2019).

Decision on Appeal for U.S. Appl. No. 13/047,287 (Jun. 18, 2019).

Notification of Transmittal of the International Search Report and the Written Opinion of the International Searching Authority, or the Declaration for International Patent Application No. PCT/US2019/018990 (dated May 8, 2019).

Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).

Non-Final Office Action for U.S. Appl. No. 16/100,172 (dated Apr. 11, 2019).

Notice of Allowability for U.S. Appl. No. 16/035,008 (dated Mar. 18, 2019).

Notice of Allowance and Fee(s) Due for U.S. Appl. No. 16/035,008 (dated Jan. 18, 2019).

Advisory Action Before the Filing of an Appeal Brief and AFCP 2.0 Decision for U.S. Appl. No. 15/376,631 (dated Dec. 19, 2018).

Notice of Allowance and Fee(s) Due and Applicant-Initiated Interview Summary for U.S. Appl. No. 15/408,155 (dated Oct. 31, 2018).

Sahu et al., "How 5G Registration Works," http://5gblogs.com/5g-registration/, 10 pages (Oct. 12, 2018).

Notification of Transmittal of the International Search Report and the Written Opinion of the International Searching Authority, or the Declaration for International Patent Application No. PCT/US2018/043985 (dated Oct. 9, 2018).

Final Office Action for U.S. Appl. No. 15/376,631 (dated Oct. 5, 2018).

Notice of Allowance and Fee(s) Due for U.S. Appl. No. 15/636,118 (dated Oct. 3, 2018).

Notification of Transmittal of the International Search Report and the Written Opinion of the International Searching Authority, or the Declaration for International Application No. PCT/US2018/030319 (dated Aug. 20, 2018).

Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).

Final Office Action for U.S. Appl. No. 15/408,155 (dated Jul. 26, 2018).

Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (Unpublished, filed Jul. 13, 2018).

Commonly-assigned, co-pending U.S. Appl. No. 16/024,422 for "Methods, Systems, and Computer Readable Media for Network Node Validation," (Unpublished, filed Jun. 29, 2018).

Notice of Allowance and Fee(s) Due for U.S. Appl. No. 15/636,118 (dated Apr. 27, 2018).

Non-Final Office Action for U.S. Appl. No. 15/376,631 (dated Apr. 18, 2018).

"Signalling Security in Telecom SS7/Diameter/5G," Enisa, pp. 1-30 (Mar. 2018).

Examiner's Answer for U.S. Appl. No. 13/047,287 (dated Feb. 26, 2018).

Advisory Action Before the Filing of an Appeal Brief and AFCP 2.0 Decision for U.S. Appl. No. 15/376,631 (dated Feb. 2, 2018).

Non-Final Office Action for U.S. Appl. No. 15/408,155 (dated Jan. 9, 2018).

Final Office Action for U.S. Appl. No. 15/376,631 (dated Nov. 28, 2017).

"GSMA Guidelines for Diameter Firewall," NetNumber Inc., pp. 1-7 (Sep. 12, 2017).

Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).

(56) References Cited

OTHER PUBLICATIONS

"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Commonly-assigned, co-pending U.S. Appl. No. 15/636,118 for "Methods, Systems, and Computer Readable Media for Validating User Equipment (UE) Location," (Unpublished, filed Jun. 28, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
Commonly-assigned, co-pending U.S. Appl. No. 15/408,155 for "Methods, Systems, and Computer Readable Media for Validating a Redirect Address in a Diameter Message," (Unpublished, filed Jan. 17, 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Commonly-assigned, co-pending U.S. Appl. No. 15/376,631 for "Methods, Systems, and Computer Readable Media for Validating Subscriber Location Information," (Unpublished, filed Dec. 12, 2016).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
DeKok, "The Network Access Identifier," Internet Engineering Task Force (IETF), RFC 7542, pp. 130 (May 2015).

"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stage1 (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (Aug. 8, 2012).
Non-Final Office Action for U.S. Appl. No. 13/047,287 (Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
Croft, N., "On Forensics: A Silent SMS Attack," Information and Computer Security Architectures (ICSA) Research Group, Department of Computer Science, pp. 1-4, University of Pretoria, South Africa (2012).
"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Commonly-assigned, co-pending U.S. Appl. No. 13/047,287 (Unpublished, filed Mar. 14, 2011).
Myers, "SmartSynch Introduces Innovative 'DCX' Smart Grid Solution at DistribuTECH,"SmartSynch News, http://www.appmesh.com/news/020309.htm, pp. 1-3 Feb. 3, 2009 (Downloaded from the Internet on Jul. 5, 2011).

(56) References Cited

OTHER PUBLICATIONS

"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Notification of Transmittal of the Internatioanl Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/US2009/061187 (dated May 17, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
Dierks et al., "The Transport Layer Security (TLS) Protocol Version 1.2," RFC 5246, pp. 1-208 (Aug. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
Housley et al., "Internet X.509 Public Key Infrastructure Certificate and Certificate Revocation List (CRL) Profile," RFC 3280, pp. 1-258 (Apr. 2002).
Non-Final Office Action for U.S. Appl. No. 17/009,683 (dated Jul. 15, 2022).
Decision to grant a European patent pursuant to Article 97(1) EPC for European Patent Application Serial No. 19710842.6 (dated Jun. 30, 2022).
Notice of Allowance for Chinese Application Serial No. 202080007649.X (dated Jun. 20, 2022).
Communication under Rule 71 (3) EPC Intention to Grant for European Patent Application Serial No. 19 749 059.2 (dated May 16, 2022).
Notification of Transmittal of the International Search Report and the Written Opinion of the International Searching Authority or the Declaration for International Application No. PCT/US2021/042853 (dated Oct. 18, 2021).
Advisory Action and Applicant-Initiated Interview Summary for U.S. Appl. No. 17/099,683 (dated May 23, 2022).
Notification of Transmittal of the International Search Report and the Written Opinion of the International Searching Authority, or the Declaration for International Application No. PCT/US2022/013373 (dated Apr. 11, 2022).
Non-Final Office Action and Examiner Interview Summary for U.S. Appl. No. 16/929,048 (dated Apr. 14, 2022).
Notice of Allowance for U.S. Appl. No. 16/732,098 (dated Apr. 6, 2022).
Examination Report for Indian Application Serial No. 202147030053 (dated Mar. 22, 2022).
Notification of Transmittal of the International Search Report and the Written Opinion of the International Searching Authority or the Declaration for International Application No. PCT/US2021/057156 (dated Mar. 3, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #S2-139E pp. 1-4 (Aug. 19-Sep. 2, 2020).
First Office Action for Japanese Application Serial No. 2021545918 (dated Mar. 8, 2022).
Non-Final Office Action for U.S. Appl. No. 17/129,487 (dated Mar. 21, 2022).
Intention to grant a European patent pursuant to Article 97(1) EPC for European Patent Application Serial No. 19710842.6 (dated Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
Notification Concerning Availability of the Publication of the International Application for International Application No. PCT/US2021/024002 (dated Jan. 20, 2022).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).
Commonly-Assigned, co-pending U.S. Appl. No. 17/319,023 for "Methods, Systems, and Computer Readable Media for Conducting a Velocity Check for Outbound Subscribers Roaming to Neighboring Countries," (Unpublished, filed May 12, 2021).
Nokia et al., "3gpp-Sbi-Consumer-Id," 3GPP TSG-CT WG4 Meeting #101e pp. 1-4 (Nov. 3-13, 2020).
Nokia et al., "SBA Network Function certificate profile," 3GPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).
Notification of Transmittal of the International Search Report and the Written Opinion of the International Searching Authority, or the Declaration for International Application No. PCT/US2021/042660 (dated Oct. 26, 2021).
Hearing Notice of Indian Application Serial No. 201947047367 (Oct. 11, 2021).
First Office Action for Japanese Application Serial No. 2019572174 (dated Sep. 14, 2021).

(56) References Cited

OTHER PUBLICATIONS

Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (dated Jul. 8, 2021).
Non-Final Office Action for U.S. Appl. No. 17/099,683 (dated Sep. 20, 2021).
Decision to grant a European patent pursuant to Article 97(1) EPC for European Patent Application Serial No. 18756018.0 (dated Jul. 29, 2021).
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (dated Apr. 21, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
"New Annex for the SEPP in TR 33.926," 3GPP TSG-SA WG3 Meeting #95-BIS, pp. 1-6 (Jun. 24-28, 2019).
"5G; Procedures for the 5G System (3GPP TS 23.502 version 15.3.0 Release 15)," ETSI TS 123 502, V15.3.0, pp. 1-330 (Sep. 2018).
"N32 message anti-spoofing within the SEPP," 3GPP TSG SA WG3 (Security), Meeting #91, pp. 1-2 (Apr. 16-20, 2018).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).

"3$^{rd}$ Generation Partnership Project; Technical Specification Group Services and System Aspects; Procedures for the 5G System (5GS); Stage 2, (Release 16),"3GPP TS 23.502, V16.6.0, pp. 1-597 (Sep. 2020).
3$^{rd}$ Generation Partnership Project; Technical Specification Group Core Network and Terminals; T8 reference point for Northbound APIs, (Release 15), 3GPP TS 29.122, V15.6.0, pp. 1-300 (Dec. 2019).
Fajardo, V. et al., "Diameter Base Protocol, Internet Engineering Task Force (IETF)," RFC 6733, pp. 1-152 (Oct. 2012).
Applicant-Initiated Interview Summary for U.S. Appl. No. 17/123,038 (dated May 30, 2023).
Applicant-Initiated Interview Summary for U.S. Appl. No. 17/095,420 (dated May 17, 2023).
Notice of Publication for European Patent Application 21718461.3 (dated Apr. 26, 2023).
Decision to Grant for European Patent Application 20720580.8 (dated May 11, 2023).
Applicant-Initiated Interview Summary for U.S. Appl. No. 17/095,420 (dated May 12, 2023).
Notice of Allowance and Fee(s) Due for U.S. Appl. No. 17/099,683 (dated May 8, 2023).
Office Action for Chinese Patent Application Serial No. 202080091056.6 (dated Mar. 25, 2023).
Applicant-Initiated Interview Summary for U.S. Appl. No. 17/099,683 (dated Apr. 17, 2023).
Final Office Action for U.S. Appl. No. 17/099,683 (dated Apr. 6, 2023).
Applicant-Initiated Interview Summary for U.S. Appl. No. 17/099,683 (dated Apr. 5, 2023).
Notice of Allowance and Fee(s) Due for U.S. Appl. No. 17/008,528 (dated Mar. 30, 2023).
Final Office Action for U.S. Appl. No. 17/123,038 (dated Mar. 9, 2023).
Supplemental Notice of Allowability for U.S. Appl. No. 17/175,260 (dated Mar. 8, 2023).
Notice of Allowance and Fee(s) Due for U.S. Appl. No. 17/175,260 (dated Feb. 27, 2023).
Applicant Initiated Interview Summary for U.S. Appl. No. 17/008,528 (dated Feb. 21, 2023).
Intent to Grant for Japanese Patent Application No. 2020-572898 (dated Feb. 14, 2023).
Intent to Grant for Japanese Patent Application No. 2021-506739 (dated Jan. 24, 2023).
Notice of Allowance and Fee(s) Due for U.S. Appl. No. 17/319,023 (dated Feb. 10, 2023).
Notice of Publication for European Patent Application No. 21720355.3 (dated Jun. 7, 2023).
Decision to Grant for European Patent Application No. 20720580.8 (dated May 11, 2023).
Intent to Grant for European Patent Application Serial No. 20842462.2 (dated Jun. 21, 2023).
Office Action for Chinese Patent Application Serial No. 201980046917.6 (dated Jun. 16, 2023).
Notice of Allowance and Applicant-Initiated Interview Summary for U.S. Appl. No. 17/095,420 (dated Jun. 30, 2023).
Notice of Allowance for U.S. Appl. No. 17/123,038 (dated Jun. 23, 2023).
Notice of Publication for European Patent Application Serial No. 21729084.0 (dated Jul. 5, 2023).

* cited by examiner

METHODS, SYSTEMS, AND COMPUTER READABLE MEDIA FOR MITIGATING 5G ROAMING ATTACKS FOR INTERNET OF THINGS (IOT) DEVICES BASED ON EXPECTED USER EQUIPMENT (UE) BEHAVIOR PATTERNS

TECHNICAL FIELD

The subject matter described herein relates to network security. More particularly, the subject matter described herein relates to methods, systems, and computer readable media for mitigating 5G roaming attacks for IoT devices based on expected UE behavior patterns.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing a service. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is that there can be fraud attacks through roaming inter-PLMN signaling for IoT devices. Examples of such attacks include location tracking attacks, denial of service (DoS) attacks, account fraud, etc. Hackers can initiate roaming traffic that appears to be legitimate towards the home core network and initiate security attacks for cellular IoT devices. In one example, inter-PLMN roaming signaling related to a fixed UE device, such as a water meter, may be initiated. Such devices are stationary and always in the home network. Thus, roaming traffic should not be generated for such devices. These and other types of inter-PLMN signaling attacks can be used to obtain subscriber information from the home network and/or to initiate a denial of service attack. The SEPP is the point of entry and exit for roaming PLMN traffic and is deployed as a signaling firewall by mobile network operators to mitigate roaming security attacks. However, analysis of expected UE behavior is not specified by the 3GPP and GSMA standards.

Accordingly, there exists a need for improved methods, systems, and computer readable media for mitigating 5G roaming security attacks.

SUMMARY

A method for mitigating a 5G roaming attack for an Internet of things (IoT) device based on expected user equipment (UE) behavior patterns includes receiving, at a network function (NF) including at least one processor, a service request message requesting a service from a home public land mobile network (PLMN) of a UE identified in the service request message, wherein the UE comprises an IoT device. The method further includes obtaining, by the NF and for the UE identified in the service request message, at least one parameter provisioned in the home PLMN to indicate an expected UE behavior pattern. The method further includes comparing, by the NF, the at least one parameter provisioned in the home PLMN to indicate the expected UE behavior pattern to at least one parameter from the service request message. The method further includes determining, by the NF and based on results of the comparing, that the at least one parameter from the service request message is not indicative of the expected UE behavior pattern of the UE. The method further includes, in response to determining that the at least one parameter from the service request message is not indicative of the expected UE behavior pattern of the UE, dropping or rejecting the service request message.

According to another aspect of the subject matter described herein, the NF comprises a security edge protection proxy (SEPP).

According to another aspect of the subject matter described herein, obtaining the at least one parameter provisioned in the home PLMN to indicate an expected UE behavior pattern includes querying a unified data management (UDM) function located in the home PLMN.

According to another aspect of the subject matter described herein, obtaining the at least one parameter provisioned in the home PLMN to indicate an expected UE behavior pattern includes querying a database internal to the SEPP and containing the at least one parameter provisioned in the home PLMN to indicate the expected UE behavior pattern.

According to another aspect of the subject matter described herein, obtaining the at least one parameter provisioned in the home PLMN to indicate the expected UE behavior pattern includes obtaining a parameter provisioned in the home PLMN using the Nnef_ParameterProvision service.

According to another aspect of the subject matter described herein, the network function includes a Diameter signaling router (DSR) having an integrated firewall.

According to another aspect of the subject matter described herein, obtaining the at least one parameter provisioned in the home PLMN to indicate an expected UE behavior pattern includes obtaining the at least one parameter by querying a home subscriber server (HSS).

According to another aspect of the subject matter described herein, obtaining the at least one parameter provisioned in the home PLMN to indicate an expected UE behavior pattern includes obtaining the at least one parameter from a database internal to the DSR.

According to another aspect of the subject matter described herein, comparing the at least one parameter provisioned in the home PLMN to indicate the expected UE behavior pattern to at least one parameter in the service request message includes comparing at least one of a mobility indicating parameter, a communication time indicating parameter, and a communication type indicating parameter to at least one of a mobility indicating parameter, a communication time indicating parameter, and a communication type indicating parameter from the service request message.

According to another aspect of the subject matter described herein, determining, based on results of the comparing, that the at least one parameter from the service request message is not indicative of the expected UE behavior pattern of the UE includes determining that at least one of the mobility, communication time, or communication type indicated by the at least one parameter in the service request message does not match at least one of the mobility, communication time, or communication type indicated by at least one parameter provisioned in the home PLMN to indicate an expected UE behavior pattern of the UE.

According to another aspect of the subject matter described herein, a system for mitigating a 5G roaming attack for an Internet of things (IoT) device based on expected user equipment (UE) behavior patterns is provided. The system includes a network function (NF) including at least one processor for receiving a service request message requesting a service from a home public land mobile network (PLMN) of a UE identified in the service request message, wherein the UE comprises an IoT device. The system further includes an expected UE behavior determiner for obtaining, for the UE identified in the service request message, at least one parameter provisioned in the home PLMN to indicate an expected UE behavior pattern of the UE, comparing the at least one parameter provisioned in the home PLMN to indicate the expected UE behavior pattern of the UE to at least one parameter from the service request message, determining, based on results of the comparing, that the at least one parameter from the service request message is not indicative of the expected UE behavior pattern of the UE, and, in response to determining that the at least one parameter from the service request message is not indicative of the expected UE behavior pattern of the UE, dropping or rejecting the service request message.

According to another aspect of the subject matter described herein, the expected UE behavior determiner is configured to obtain the at least one parameter provisioned in the home PLMN to indicate an expected UE behavior pattern by querying a unified data management (UDM) function located in the home PLMN.

According to another aspect of the subject matter described herein, the expected UE behavior determiner is configured to obtain the at least one parameter provisioned in the home PLMN to indicate an expected UE behavior pattern by querying an expected UE behavior parameter database internal to the SEPP and containing the at least one parameter provisioned in the home PLMN to indicate the expected UE behavior pattern.

According to another aspect of the subject matter described herein, the at least one parameter provisioned in the home PLMN to indicate the expected UE behavior pattern comprises at least one parameter provisioned in the home PLMN using the Nnef_ParameterProvision service.

According to another aspect of the subject matter described herein, the NF comprises a DSR and the expected UE behavior determiner is configured to obtain the at least one parameter provisioned in the home PLMN to indicate an expected UE behavior pattern by querying a home subscriber server (HSS).

According to another aspect of the subject matter described herein, the NF comprises a DSR and the expected UE behavior determiner is configured to obtain the at least one parameter provisioned in the home PLMN to indicate an expected UE behavior pattern by querying an expected UE behavior parameter database internal to the DSR.

According to another aspect of the subject matter described herein, the expected UE behavior determiner is configured to compare the at least one parameter provisioned in the home PLMN to indicate the expected UE behavior pattern to at least one parameter in the service request message by comparing at least one of a mobility indicating parameter, a communication time indicating parameter, and a communication type indicating parameter to at least one of a mobility indicating parameter, a communication time indicating parameter, and a communication type indicating parameter from the service request message.

According to another aspect of the subject matter described herein, a non-transitory computer readable medium having stored thereon executable instructions that when executed by a processor of a computer control the computer to perform steps is provided. The steps include receiving, at a network function (NF) including at least one processor, a service request message requesting a service from a home public land mobile network (PLMN) of a UE identified in the service request message, wherein the UE comprises an Internet of things (IoT) device. The steps further include obtaining, by the NF and for the UE identified in the service request message, at least one parameter provisioned in the home PLMN to indicate an expected UE behavior pattern. The steps further include comparing, by the NF, the at least one parameter provisioned in the home PLMN to indicate the expected UE behavior pattern to at least one parameter from the service request message. The steps further include determining, by the NF and based on results of the comparing, that the at least one parameter from the service request message is not indicative of the expected UE behavior pattern of the UE. The steps further include, in response to determining that the at least one parameter from the service request message is not indicative of the expected UE behavior pattern of the UE, dropping or rejecting the service request message.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
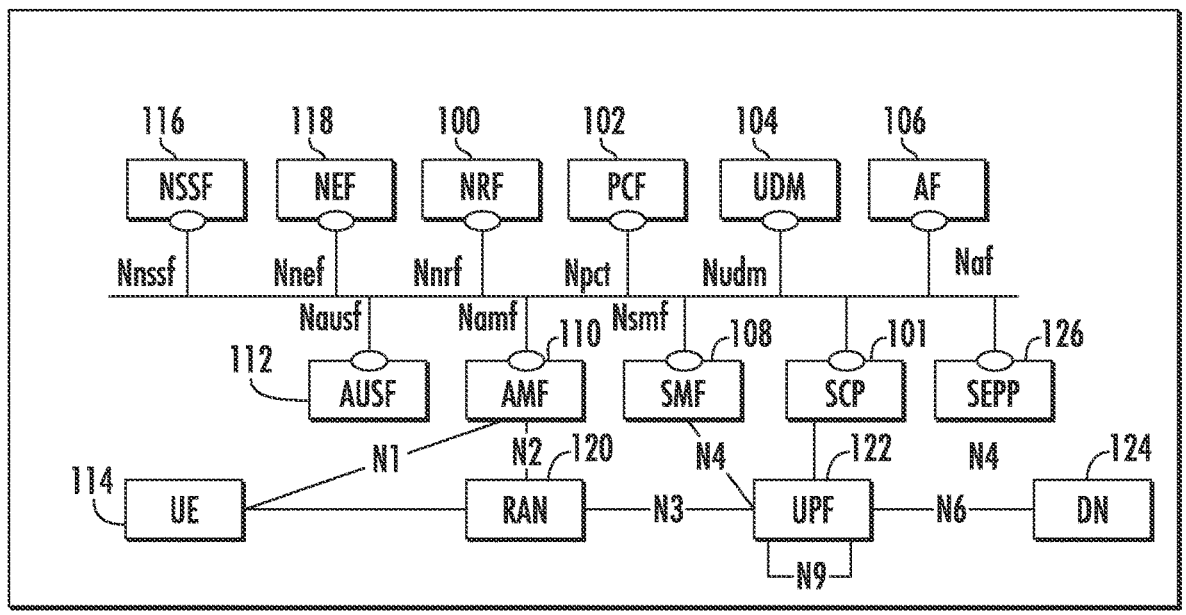
FIG. 1 is a network diagram illustrating an exemplary 5G network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address.

In FIG. 1, any of the network functions (other than NRF 100) can be consumer NFs producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services. As will be described in further detail below, UDM 104 may store parameters provisioned for home network UEs that indicate expected UE behavior patterns. These parameters may be used to identify and mitigation roaming security attacks.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As described above, one problem with the 3GPP network architecture is that while the SEPP is used as a firewall for home networks, procedures for identifying and blocking roaming security attacks are not specified by the 3GPP or GSMA standards.

The ability to block 5G roaming security attacks is especially important in that massive IoT is one of the most important use cases of 5G network deployments. Roaming security for IoT devices is of prime importance. The subject matter described here in includes methods for mitigating roaming fraud security attacks using expected UE device behaviors. Examples of such behaviors include stationary device indications, allowed geographic areas for IoT device movement, allowed/scheduled communication time for IoT devices, etc. In one example, the 5G SEPP obtains expected UE behavior pattern information from the UDM and blocks inter-PLMN communications do not comply with the expected UE behaviors.

One example of an expected UE behavior that can be monitored by the SEPP described herein is whether or not the UE is stationary. Fixed devices, such as water meters, should not roam outside of the home network. Accordingly, if an SEPP receives a 5G service request indicating that a stationary device, such as a water meter is roaming, the SEPP may block inter-PLMN messaging relating to roaming of stationary devices. As will be shown in detail below, whether a device is stationary or not can be obtained by the SEPP sending a query message to the UDM.

Another example of an expected UE behavior that can be used by the SEPP to identify fraudulent roaming security attacks is scheduled communication times of a UE. For example, a low power wide area (LWPA) IoT device may communicate at scheduled times of day. One such LWPA device may be a smart electric power meter that is scheduled to a send power consumption measurement at 12:00 a.m. on a daily basis or to send a health status message every hour. If the SEPP receives a message from the power meter that is outside of one of these scheduled times, where examples of such messages include user equipment context management (UECM) registration, PDU session updates, non-IP data, mobile originated (MO) data communication, etc., the SEPP may identify such communications as fraudulent and block or reject such messages.

In another example, the SEPP may use geofencing information to identify inter-PLMN communications as fraudulent. For example, some vehicles may be geofenced to communicate or travel in a predefined tracking area/coverage area (TA/CA) or PLMN. Roaming signaling identifying such a vehicle that is outside of one of these geographic areas may be from an attacker instead of the vehicle and may be classified by the SEPP as fraudulent and blocked.

The SEPP is at an ideal location to intercept fraudulent signaling before the signaling has a chance to enter the home PLMN of the UE, such as an IoT device. However, as described above the 3GPP or GSMA standards do not define procedures to be used by the SEPP to identify attack traffic. The subject matter described herein includes a methodology for obtaining expected UE behavior information provisioned in the HPLMN and using that information to identify fraudulent inter-PLMN communications.

In 5G communications networks, the UDM network function hosts UE subscription data, which includes expected UE behavior data, such as a stationary indication to indicate if a UE is fixed or mobility enabled, a UE's expected geographical movement, whether UE communications are periodic or on-demand, and scheduled communication times that identify the time zone and day of week when the UE is available for communications. These expected UE behavior parameters are used to derive core network assisted RAN parameter tuning, which aids the RAN to minimize state transitions and achieve optimum network behavior. The SEPP described herein uses these parameters to identify expected UE behavior and determine whether parameters in a 5G service request message are indicative of the expected UE behavior or not. If the SEPP determines that the, parameters are not indicative of expected UE behavior, the SEPP may block or reject the service request message.

The expected UE behavior parameters can be provisioned directly at the UDM or by third party applications (application functions or AFs) through the NEF, using the NEF exposed Nnef_ParameterProvision service to provision these expected UE behavior parameters. Examples of expected UE behavior parameters and provisioning are described in 3GPP TS 23.502 and 3GPP TS 29.122.

The SEPP described herein screens inter-PLMN service requests relating to an outbound roaming subscriber coming from a remote PLMN via the N32 interface. The SEPP validates the message against the expected UE behavior parameters obtained from the UDM for a given outbound roaming subscriber. Any message not satisfying the expected UE behavior shall be marked as vulnerable, and the SEPP may discard and/or reject the message.

Figure 2:
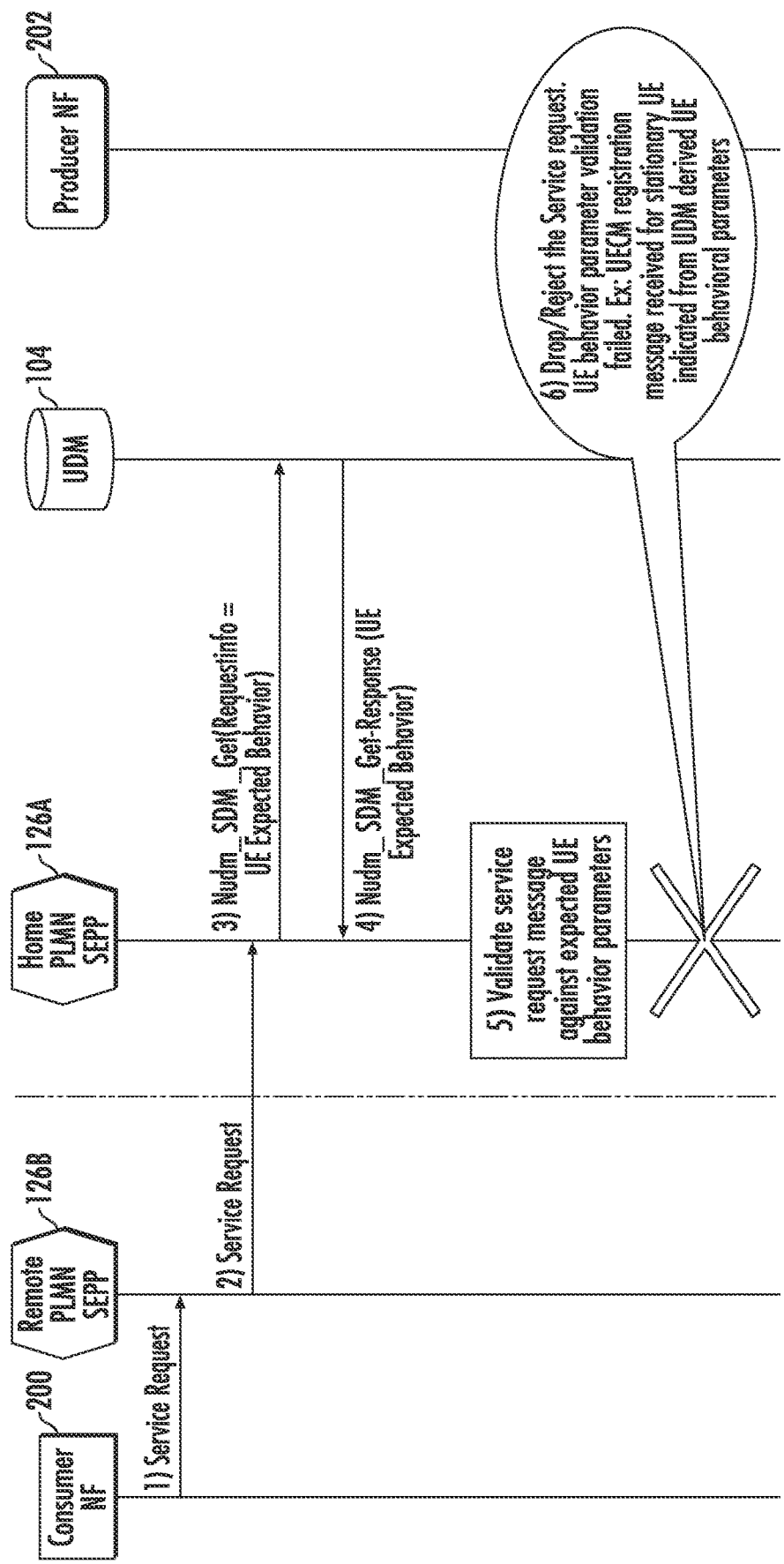
FIG. 2 is a message flow diagram illustrating exemplary messages exchanged for mitigating a security attack based on expected UE behavior where the node that performs the security attack mitigation is a home network SEPP.

FIG. 2 is a message flow diagram illustrating expected UE behavior validation at a home network SEPP to mitigate inter-PLMN roaming attacks. Referring to FIG. 2, in line 1, a consumer NF 200 sends a service request to a its local PLMN SEPP 126B. SEPP 126B receives the service request and forwards the service request in line 2 to the home network SEPP 126A.

In line 3, home network SEPP 126A, in response to the service request, sends an Nudm_SDM_Get message to UDM 104. The Nudm_SDM_Get message requests expected UE behavior parameters from UDM 104 using UE identifying information obtained from the service request message.

In response to the Nudm_SDM_Get message, UDM 104 performs a lookup in its subscription database and finds a record corresponding to the UE identified in the Nudm_SDM_Get message. In line 4, UDM 104 responds to home SEPP 126A with an Nudm_SDM_Get response message containing at least one parameter indicative of expected UE behavior. In step 5, home PLMN SEPP 126A compares the UE behavior parameters extracted from the service request with the UE expected behavior parameters obtained from the UDM. If the comparison indicates that the behaviors match, home PLMN SEPP B will forward the service request message to producer NF 202, which will provide the service requested by the service request message. In this example, it is assumed that the parameters in the service request message do not indicate an expected UE behavior. Accordingly in step 6, home PLMN SEPP 126A drops or rejects the service request because the validation fails.

Figure 3:
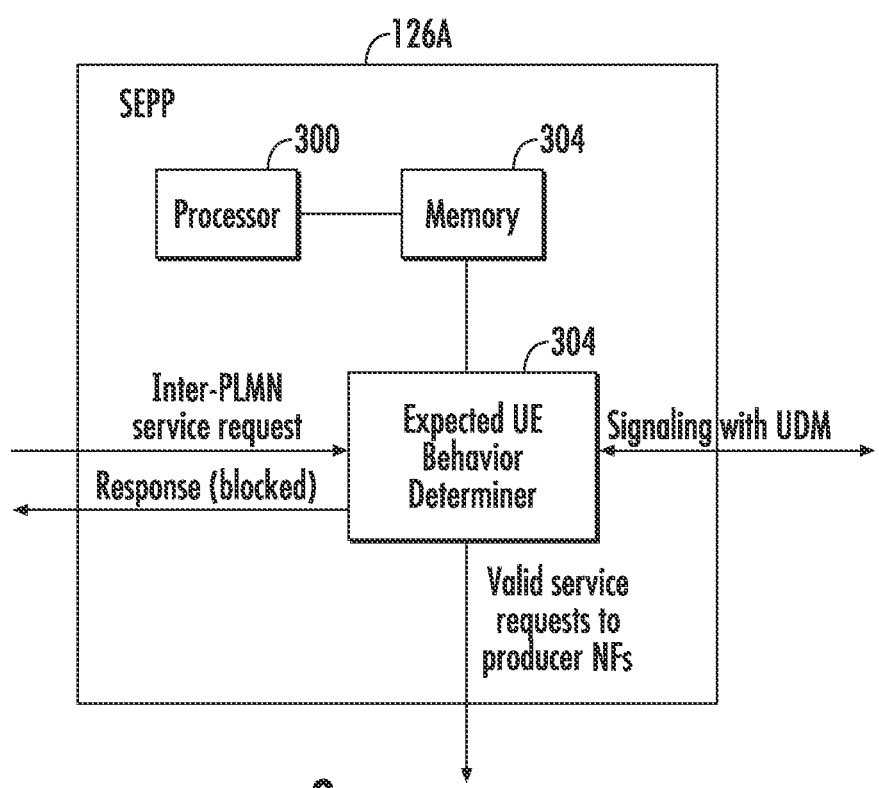
FIG. 3 is a block diagram illustrating an SEPP configured to mitigate roaming security attacks based on expected UE behavior.

FIG. 3 is a block diagram illustrating an exemplary SEPP 126A suitable for mitigating 5G roaming security attacks based on expected UE behavior. Referring to FIG. 3, SEPP 126A includes at least one processor 300 and memory 302. SEPP 126A further includes an expected UE behavior determiner 304 that may be stored in memory 302 and executed by processor 300. Expected UE behavior determiner 304 receives inter-PLMN service requests from attackers and legitimate remote SEPPs. Expected UE behavior determiner 304 also signals with the UDM to obtain expected UE behavior parameters. Expected UE behavior determiner 304 compares the expected UE behavior parameters from the service request messages with the parameters obtained from the UDM to determine whether UE behavior indicated by the service request message is as expected. If the behavior is as expected, expected UE behavior determiner 304 may forward valid signaling to the home PLMN. If expected UE behavior determiner 304 determines that the UE behavior indicated by the service request is not as expected, UE behavior determiner 304 may block or reject such signaling.

Figure 4:
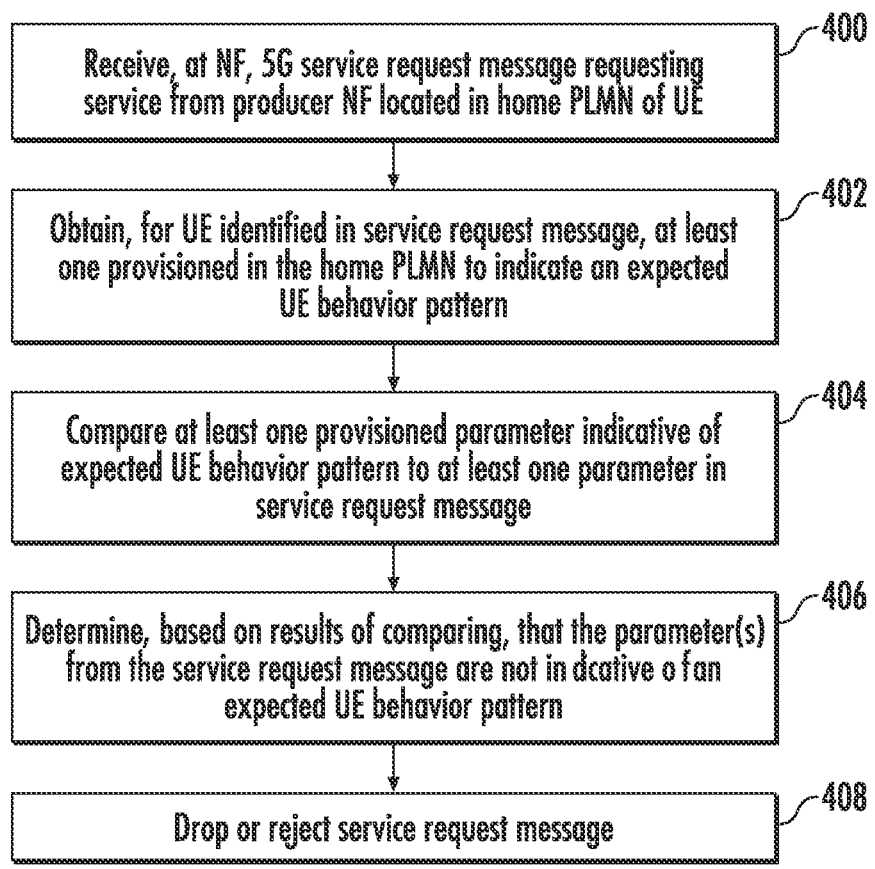
FIG. 4 is a flow chart illustrating an exemplary process for mitigating roaming security attacks based on expected UE behavior.

FIG. 4 is a flow chart illustrating an exemplary process for mitigating 5G roaming security attacks based on expected UE behavior. Referring to FIG. 4, at step 400, an NF, such as a home network SEPP, receives a service request message requesting a service from a home PLMN of a UE identified in the service request message. For example, SEPP 126A may receive a service request message requesting service from a producer NF. The service request message may be an Nudm_UECM_Registration Request message directed to the UDM. In another example, the service request message may be a UE authentication message, PDU session establishment message for IP or non-IP data delivery, a non-IP data delivery mobile originated (MO) or mobile terminated (MT) message, etc. The home network SEPP may receive service requests over the N32 interface through transport layer security (TLS) or protocol for N32 interconnect security (PRINS) protection modes. However, even though using these security mechanisms, service requests can be fraudulent.

In step 402, the NF obtains, for the UE identified in the service request message, at least one parameter provisioned in the home PLMN to indicate an expected UE behavior pattern. For example, application functions (AFs) may provision expected UE behavior patterns in the UDM using the Nnef_ParameterProvision service defined in 3GPP TS 23.502. Examples of expected UE behavior parameters that may be provisioned in the home PLMN are defined in Section 4.15.6.3 of 3GPP TS 23.502. Table 1 shown below is an example of expected UE behavior parameters that may be used by an NF, such as an SEPP, to screen incoming service request messages requesting service from the home PLMN on behalf of a UE.

TABLE 1

Expected UE Behavior Parameters.

| Expected UE Behaviour parameter | Description |
|---|---|
| Expected UE Moving Trajectory | Identifies the UE's expected geographical movement Example: A planned path of movement |
| Stationary Indication | Identifies whether the UE is stationary or mobile [optional] |
| Communication Duration Time | Indicates for how long the UE will normally stay in CM-Connected for data transmission. Example: 5 minutes. [optional] |
| Periodic Time | Interval Time of periodic communication Example: every hour. [optional] |
| Scheduled Communication Time | Time and day of the week when the UE is available for communication. Example: Time: 13:00-20:00, Day: Monday. [optional] |
| Battery Indication | Identifies power consumption criticality for the UE: if the UE is battery powered with not rechargeable/not replaceable battery, battery powered with rechargeable/replaceable battery, or not battery powered. [optional] |
| Traffic Profile | Identifies the type of data transmission: single packet transmission (UL or DL), dual packet transmission (UL with subsequent DL or DL with subsequent UL), multiple packets transmission [optional] |
| Scheduled Communication Type | Indicates that the Scheduled Communication Type is Downlink only or Uplink only or Bi-directional [To be used together with Scheduled Communication Time] Example: <Scheduled Communication Time>, DL only. [optional] |
| Expected Time and Day of Week in Trajectory | Identifies the time and day of week when the UE is expected to be at each location included in the Expected UE Moving Trajectory. [optional] |

Table 1 is a copy of table 4.15.6.3-1 from 3GPP TS 23.502. The expected UE behavior parameters identified in Table 1 may be provisioned by an AF or other node to indicate expected UE behaviors. As indicated above, these parameters are normally used by the home PLMN to communicate with the UE over the air interface. According to the subject matter described herein, the SEPP, the SCP, or other node may use these parameters to screen incoming service request messages. One parameter from Table 1 that may be used to screen service request messages is the stationary indication parameter, which identifies a UE as being stationary or mobile. Any of the other parameters may also be used, such as scheduled communication time, periodic time, communication duration time, traffic profile, scheduled communication type, etc.

In the example illustrated in FIG. 2, SEPP 126A obtains the expected UE behavior parameters from the UDM. In alternate implementation, the expected UE behavior parameters, such as those illustrated in Table 1, may be provisioned at the SEPP so that the SEPP is not required to query the UDM in response to receiving a service request message. Instead, in such an implementation, the SEPP would query its internal database using a subscriber or UE identifier in the service request message to obtain the expected UE behavior parameter.

In step 406, the NF, such as the SEPP, compares the parameter or parameters from the UDM or internal database to the parameters and the service request message. For example, SEPP 126A may compare a mobility indicating parameter from the service request message to a stationary indication parameter in the data obtained from the home PLMN to determine whether the behavior indicated by the service request matches the expected UE behavior indicated by the value of the stationary indication parameter. Using the expected UE behavior parameters in Table 1 as an example, if the value of the stationary indication parameter provisioned in the home PLMN indicates that the UE is a stationary device, and the service request message is an Nudm_UECM_Registration Request message with the registration type parameter set to "mobility registration update", then the NF may determine that UE behavior indicated by the service request message is abnormal or unexpected. Section 4.2.2.2.1 of 3GPP TS 23.502 defines the mobility registration update registration type as follows:

Mobility Registration Update upon changing to a new Tracking Area (TA) outside the UE's Registration Area in both CM-CONNECTED and CM-IDLE state, or when the UE needs to update its capabilities or protocol parameters that are negotiated in Registration procedure with or without changing to a new TA, a change in the UE's Preferred Network Behaviour that would create an incompatibility with the Supported Network Behaviour provided by the serving AMF, or when the UE intends to retrieve LADN Information.

In the example above, the mobility registration update registration type can be used to update the tracking area or the capabilities of a mobile device. Accordingly, the receipt of a Nudm_UECM_Registration Request to update the tracking area of a device with a stationary indication parameter value set to "stationary" may be viewed as unexpected behavior, while the receipt of an Nudm_UECM_Registration Request to update the capabilities of a device with a stationary indication parameter set to "stationary" may not be viewed as an unexpected behavior.

In another example, if the UE has a provisioned stationary indication parameter set to "mobile" and an Nudm_UECM_Registration Request to update the tracking area of a device is received, the value of the "Expected UE moving trajectory" parameter may be checked to determine whether the tracking area specified in the Nudm_UECM_Registration Request is within the trajectory specified by the value of the Expected UE moving trajectory parameter. If the tracking area specified in the Nudm_UECM_Registration Request is not within the trajectory specified by the value of the Expected UE moving trajectory parameter, then the behavior of the UE indicated by the Nudm_UECM_Registration Request message may be determined to be unexpected, and the Nudm_UECM_Registration Request message may be discarded and/or blocked from entering the home PLMN.

In other examples, the NF may compare communication times, frequency, duration, or other behavior indicated by the parameters in the service request message to determine to the expected UE behavior parameters provisioned in the home PLMN to determine whether the UE behavior indicated by the service request message matches the UE behavior indicated by the expected UE behavior parameter(s) provisioned in the home PLMN for the UE. If the service request message indicates that the UE is communicating at a different time, with a different frequency, and/or for a different duration than indicated by the expected UE behavior parameters provisioned for the UE in the home PLMN, the NF may determine that the UE behavior indicated by the service request message is not an expected UE behavior.

In step 406, the NF determines, based on results of the comparing, that the parameters from the service request are not indicative of an expected UE behavior pattern. Using any of the examples described above, the NF may determine that a UE behavior indicated by the service request message is not an expected UE behavior.

In step, 408, the NF drops or rejects the service request message. In the examples described above, the UE's communication pattern is validated against information obtained from the UDM. In an alternate example, the UE behavior patterns can be directly provisioned at the SEPP.

In the examples described above, service requests are validated by a home network SEPP. In another example, the NF that analyzes service requests to determine whether they indicate an expected or unexpected UE behavior may be a 4G NF, such as a Diameter signaling router (DSR) with an integrated firewall. The DSR may perform similar steps to those described above for the 5G case to validate 4G service request messages and block or reject such messages when they do not match an expected UE behavior pattern.

Figure 5:
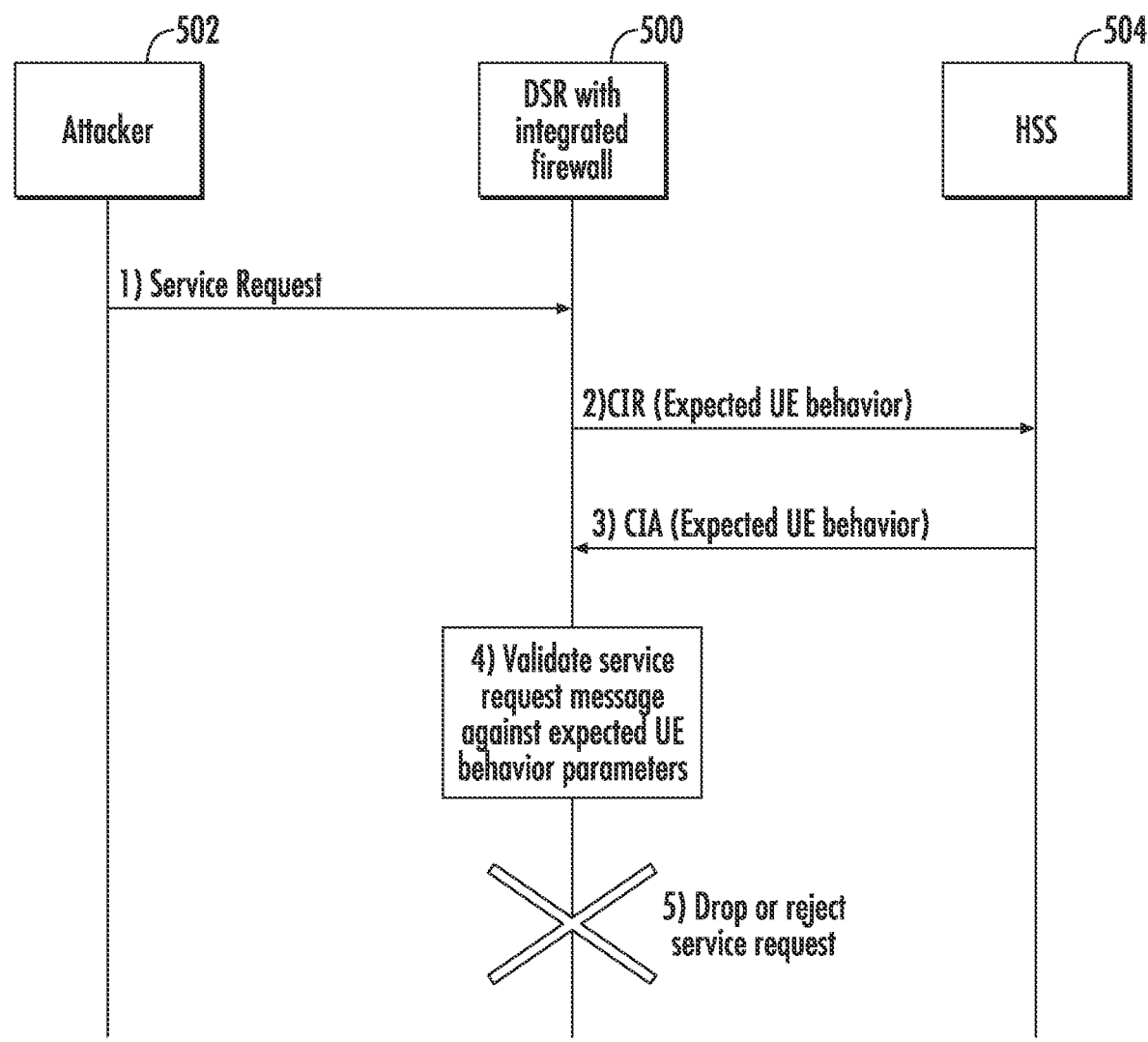
FIG. 5 is a message flow diagram illustrating exemplary messages exchanged for mitigating a security attack based on expected UE behavior where the node that performs the security attack mitigation is a Diameter signaling router with an integrated firewall.

FIG. 5 is a message flow diagram illustrating the use of a DSR to perform such functions. Referring to FIG. 5, a DSR 500 with an integrated firewall may be located at the edge of a home network, so that inter-PLMN signaling relating to roaming subscribers first arrives at DSR 500. DSR 500 may implement Diameter relay agent functionality as described in IETF RFC 6733. Briefly, such functionality includes routing Diameter messages based on Diameter layer information in the messages. In addition to the basic Diameter relay agent functionality, DSR 500 may perform expected UE behavior validation using similar steps as those described above with regard to SEPP 126A.

Referring to the message flow in FIG. 5, in line 1, an attacker sends a service request to a home PLMN. The service request may be an update location request or other message that contains UE identifying information as well as at least one parameter indicative of a UE behavior. For example, the message type of an update location request message may indicate that the UE is mobile.

In response to the service request message, in line 2, DSR 500 queries home subscriber server (HSS) 504 using a Diameter configuration information request (CIR) message to obtain an expected UE behavior parameter from HSS 504. In response to the CIR message, HSS 504 performs a lookup and its UE subscription database and extracts expected UE behavior parameters, such as mobile or stationary indication, expected UE location, expected UE communication pattern statistics, etc. In line 3 of the message flow diagram, HSS 504 returns the expected UE behavior parameters to DSR 500 in a configuration information answer (CIA) message.

In step 4, DSR 500 validates the service request message against the expected UE behavior parameters provisioned in the home PLMN for the UE. If the expected behavior parameters indicate that the service request message represents an expected UE behavior, DSR 500 may forward the service request message into the home PLMN of the subscriber. If the expected UE behavior parameters obtained from the HSS indicate that the UE behavior is not as expected, DSR 500 may drop or reject the service request, as indicated by step 5. As with the SEPP example above, instead of obtaining the expected UE behavior parameters from the HSS, in an alternate implementation, the expected UE behavior parameters may be provisioned in a database that is internal to the DSR, and the DSR may query the database to obtain the expected UE behavior parameters used to validate an inter-PLMN service request.

An advantage of the subject matter described herein includes the mitigation of roaming security attacks using expected IoT device behavior parameters, such as stationary indication, communication frequency, communication type, communication duration, allowed geographic area for communication, etc. Another advantage of performing the mitigation of roaming security attacks using the methods and systems described herein is that the expected UE behavior parameters are already provisioned in the network for purposes other than roaming security. Re-using these parameters from roaming security eliminates the need for complex or computationally expensive algorithms to derive expected UE behavior patterns. As a result, the ability to screen service requests more quickly may be achieved.

The disclosure of each of the following references is hereby incorporated herein by reference in its entirety.

REFERENCES 1. 3GPP TS 23.502 V16.6.0 (2020 September), Technical Specification, 3rd Generation Partnership Project; Technical Specification Group Services and System Aspects; Procedures for the 5G System (5GS); Stage 2, (Release 16).
2. 3GPP TS 29.122 V15.6.0 (2019 December), Technical Specification, 3rd Generation Partnership Project; Technical Specification Group Core Network and Terminals; T8 reference point for Northbound APIs; (Release 15).
3. IETF RFC 6733; Diameter Base Protocol (October 2012).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for mitigating a 5G roaming attack for an Internet of things (IoT) device based on expected user equipment (UE) behavior patterns, the method comprising:
receiving, at a security edge protection proxy (SEPP) including at least one processor, a service request message requesting a service from a home public land mobile network (PLMN) of a UE identified in the service request message, wherein the UE comprises an IoT device;
obtaining, by the SEPP and for the UE identified in the service request message, at least one parameter provisioned in the home PLMN to indicate an expected UE behavior pattern of the UE, wherein the at least one parameter provisioned in the home PLMN includes a 3GPP-defined Expected UE Behavior parameter used by the home PLMN to communicate with the UE over an air interface;

comparing, by the SEPP, the Expected UE Behavior parameter to at least one parameter from the service request message;

determining, by the SEPP and based on results of the comparing, that the at least one parameter from the service request message is not indicative of the expected UE behavior pattern of the UE; and in response to determining that the at least one parameter from the service request message is not indicative of the expected UE behavior pattern of the UE, dropping or rejecting, by the SEPP, the service request message.

2. The method of claim 1 wherein obtaining the Expected UE Behavior parameter includes querying a unified data management (UDM) function located in the home PLMN.

3. The method of claim 1 wherein obtaining the Expected UE Behavior parameter includes querying a database internal to the SEPP and containing the Expected UE behavior parameter.

4. The method of claim 1 wherein obtaining the Expected UE Behavior parameter includes obtaining a parameter provisioned in the home PLMN using an Nnef_ParameterProvision service.

5. The method of claim 1 wherein comparing the Expected UE Behavior parameter to at least one parameter in the service request message includes comparing at least one of a mobility indicating parameter, a communication time indicating parameter, and a communication type indicating parameter to at least one of a mobility indicating parameter, a communication time indicating parameter, and a communication type indicating parameter from the service request message.

6. The method of claim 1 wherein determining, based on results of the comparing, that the at least one parameter from the service request message is not indicative of the expected UE behavior pattern of the UE includes determining that at least one of mobility, communication time, or communication type indicated by the at least one parameter in the service request message does not match at least one of mobility, communication time, or communication type indicated by the Expected UE Behavior parameter.

7. A system for mitigating a 5G roaming attack for an Internet of things (IoT) device based on expected user equipment (UE) behavior patterns, the system comprising:

a security edge protection proxy (SEPP) including at least one processor for receiving a service request message requesting a service from a home public land mobile network (PLMN) of a UE identified in the service request message, wherein the UE comprises an IoT device;

an expected UE behavior determiner executable by the at least one processor of the SEPP for obtaining, for the UE identified in the service request message, at least one parameter provisioned in the home PLMN to indicate an expected UE behavior pattern of the UE, wherein the at least one parameter provisioned in the home PLMN includes a 3GPP-defined Expected UE Behavior parameter used by the home PLMN to communicate with the UE over an air interface, the expected UE behavior determiner for comparing the Expected UE Behavior parameter to at least one parameter from the service request message, determining, based on results of the comparing, that the at least one parameter from the service request message is not indicative of the expected UE behavior pattern of the UE, and, in response to determining that the at least one parameter from the service request message is not indicative of the expected UE behavior pattern of the UE, dropping or rejecting the service request message.

8. The system of claim 7 wherein the expected UE behavior determiner is configured to obtain the Expected UE Behavior parameter by querying a unified data management (UDM) function located in the home PLMN.

9. The system of claim 7 wherein the expected UE behavior determiner is configured to obtain the Expected UE Behavior parameter by querying an expected UE behavior parameter database internal to the SEPP and containing the Expected UE Behavior parameter.

10. The system of claim 7 wherein Expected UE Behavior parameter is provisioned in the home PLMN using an Nnef_ParameterProvision service.

11. The system of claim 7 wherein the expected UE behavior determiner is configured to compare the Expected UE Behavior parameter to at least one parameter in the service request message by comparing at least one of a mobility indicating parameter, a communication time indicating parameter, and a communication type indicating parameter to at least one of a mobility indicating parameter, a communication time indicating parameter, and a communication type indicating parameter from the service request message.

12. A non-transitory computer readable medium having stored thereon executable instructions that when executed by a processor of a computer control the computer to perform steps comprising:

receiving, at a security edge protection proxy (SEPP) including at least one processor, a service request message requesting a service from a home public land mobile network (PLMN) of a UE identified in the service request message, wherein the UE comprises an Internet of things (IoT) device;

obtaining, by the SEPP and for the UE identified in the service request message, at least one parameter provisioned in the home PLMN to indicate an expected UE behavior pattern, wherein the at least one parameter provisioned in the home PLMN includes a 3GPP-defined Expected UE Behavior parameter used by the home PLMN to communicate with the UE over an air interface;

comparing, by the SEPP, the Expected UE Behavior parameter to at least one parameter from the service request message;

determining, by the SEPP and based on results of the comparing, that the at least one parameter from the service request message is not indicative of the expected UE behavior pattern of the UE; and in response to determining that the at least one parameter from the service request message is not indicative of the expected UE behavior pattern of the UE, dropping or rejecting, by the SEPP, the service request message.

* * * * *

UNITED STATES PATENT AND TRADEMARK OFFICE
CERTIFICATE OF CORRECTION

| | | |
|---|---|---|
| PATENT NO. | : 11,812,271 B2 | Page 1 of 1 |
| APPLICATION NO. | : 17/125943 | |
| DATED | : November 7, 2023 | |
| INVENTOR(S) | : Mahalank et al. | |

It is certified that error appears in the above-identified patent and that said Letters Patent is hereby corrected as shown below:

On the Title Page

On Page 3 Column 1 item [56], Line 61, Delete "Krishnan" and insert -- Krishan --.

On Page 7 Column 1 item [56], Line 68, Delete "130" and insert -- 1-30 --.

On Page 7 Column 2 item [56], Line 1, Delete ""Digitial" and insert -- "Digital --.

On Page 7 Column 2 item [56], Line 29, Delete "11,"" and insert -- 11)," --.

On Page 8 Column 1 item [56], Line 12, Delete "Internatioanl" and insert -- International --.

In the Drawings

In Sheet 4 of 5 (Reference Numeral 406) (FIG. 4), Line 2, Delete "in dicative o fan" and insert -- indicative of an --.

In the Specification

In Column 7, Line 8, Delete "(LWPA)" and insert -- (LPWA) --.

In Column 7, Line 9, Delete "LWPA" and insert -- LPWA --.

Signed and Sealed this
Eleventh Day of June, 2024

Katherine Kelly Vidal
*Director of the United States Patent and Trademark Office*